US012639096B2

(12) United States Patent   (10) Patent No.: US 12,639,096 B2
Dawkins et al.   (45) Date of Patent: May 26, 2026

(54) SYSTEMS AND METHODS FOR REMOTE PERIPHERAL DEVICE CONTROL VIRTUALIZATION

(71) Applicant: Dell Products L.P., Round Rock, TX (US)

(72) Inventors: William Price Dawkins, Lakeway, TX (US); John S. Harwood, Boston, MA (US); Douglas Lang Farley, Round Rock, TX (US); David Craig Lawson, Richardson, TX (US); Srinivas Giri Raju Gowda, Fremont, CA (US); Shawn M. Swanson, Chanhassen, MN (US); Judith A. Furlong, Natick, MA (US)

(73) Assignee: Dell Products L.P., Round Rock, TX (US)

( * ) Notice: Subject to any disclaimer, the term of this patent is extended or adjusted under 35 U.S.C. 154(b) by 601 days.

(21) Appl. No.: 18/160,731

(22) Filed: Jan. 27, 2023

(65) Prior Publication Data

US 2024/0256319 A1   Aug. 1, 2024

(51) Int. Cl.
G06F 9/455 (2018.01)

(52) U.S. Cl.
CPC ................... G06F 9/45558 (2013.01); *G06F 2009/45579* (2013.01)

(58) Field of Classification Search
CPC ......... G06F 9/45558; G06F 2009/4557; G06F 2009/45579; G06F 9/44; G06F 9/54; G06F 11/34; G06F 15/177; G06N 20/00; H04L 67/10
See application file for complete search history.

(56) References Cited

U.S. PATENT DOCUMENTS

2017/0289313 A1*  10/2017  Vajravel ................ G06F 13/385
2022/0261266 A1*   8/2022  Huilgol ............... G06F 12/0882
2022/0283946 A1*   9/2022  Ng ....................... G06F 12/0238
2023/0359395 A1*  11/2023  Beygi ................... G06F 3/0664

OTHER PUBLICATIONS

Amit et al., vIOMMU: Efficient IOMMU Emulation 2011 (14 pages).
Lim et al., Optimizing Nested Virtualization Performance Using Direct Virtual Hardware, ASPLOS'20, Mar. 16-20, 2020, (18 pages).
Virtualization Technology for Directed I/O, Architecture Specification, Jun. 2022 (328 pages).

* cited by examiner

*Primary Examiner* — Kenneth Tang
(74) *Attorney, Agent, or Firm* — Chamberlain, Hrdlicka, White, Williams & Aughtry; Aly Z. Dossa

(57) ABSTRACT
A method for processing a function command, the method that includes obtaining, by a device controller intermediary, a function command from a virtual machine, where the function command is associated with a peripheral device, making a first determination that the function command is associated with a remote peripheral device, forwarding the function command to the remote peripheral device, and in response to forwarding the function command, receiving processed data from the remote peripheral device, and providing the processed data to the virtual machine.

17 Claims, 12 Drawing Sheets

SYSTEMS AND METHODS FOR REMOTE PERIPHERAL DEVICE CONTROL VIRTUALIZATION

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

DETAILED DESCRIPTION

General Notes

Figure 1A:
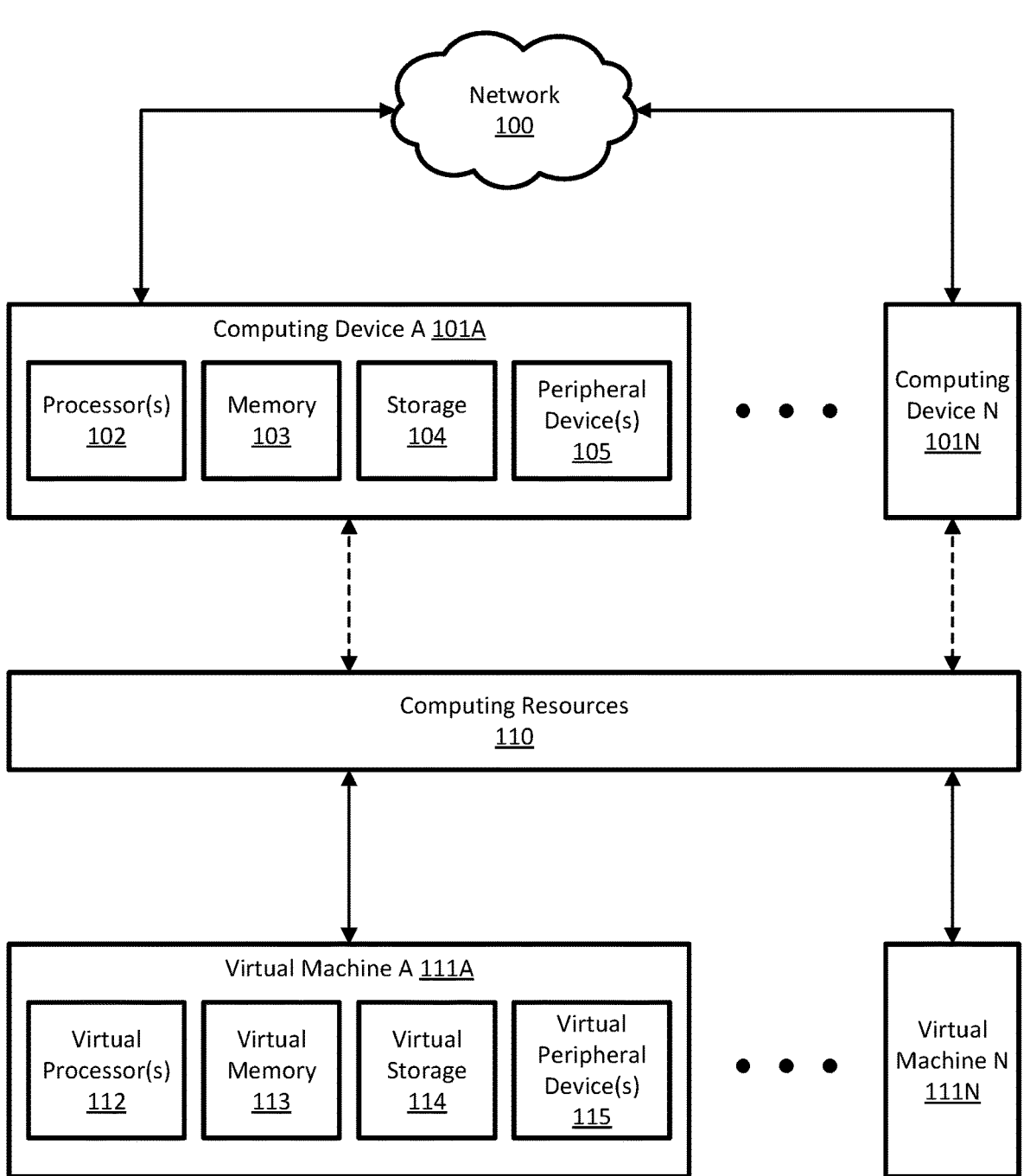
FIG. 1A shows a diagram of a system, in accordance with one or more embodiments.

As it is impracticable to disclose every conceivable embodiment of the described technology, the figures, examples, and description provided herein disclose only a limited number of potential embodiments. One of ordinary skill in the art would appreciate that any number of potential variations or modifications may be made to the explicitly disclosed embodiments, and that such alternative embodiments remain within the scope of the broader technology. Accordingly, the scope should be limited only by the attached claims. Further, certain technical details, known to those of ordinary skill in the art, may be omitted for brevity and to avoid cluttering the description of the novel aspects.

For further brevity, descriptions of similarly-named components may be omitted if a description of that similarly-named component exists elsewhere in the application.

Accordingly, any component described with regard to a specific figure may be equivalent to one or more similarly-named components shown or described in any other figure, and each component incorporates the description of every similarly-named component provided in the application (unless explicitly noted otherwise). A description of any component is to be interpreted as an optional embodiment-which may be implemented in addition to, in conjunction with, or in place of an embodiment of a similarly-named component described for any other figure.

—Lexicographical Notes—

As used herein, adjective ordinal numbers (e.g., first, second, third, etc.) are used to distinguish between elements and do not create any particular ordering of the elements. As an example, a "first element" is distinct from a "second element", but the "first element" may come after (or before) the "second element" in an ordering of elements. Accordingly, an order of elements exists only if ordered terminology is expressly provided (e.g., "before", "between", "after", etc.) or a type of "order" is expressly provided (e.g., "chronological", "alphabetical", "by size", etc.). Further, use of ordinal numbers does not preclude the existence of other elements. As an example, a "table with a first leg and a second leg" is any table with two or more legs (e.g., two legs, five legs, thirteen legs, etc.). A maximum quantity of elements exists only if express language is used to limit the upper bound (e.g., "two or fewer", "exactly five", "nine to twenty", etc.). Similarly, singular use of an ordinal number does not imply the existence of another element. As an example, a "first threshold" may be the only threshold and therefore does not necessitate the existence of a "second threshold".

As used herein, the word "data" is used as an "uncountable" singular noun—not as the plural form of the singular noun "datum". Accordingly, throughout the application, "data" is generally paired with a singular verb (e.g., "the data is modified"). However, "data" is not redefined to mean a single bit of digital information. Rather, as used herein, "data" means any one or more bit(s) of digital information that are grouped together (physically or logically). Further, "data" may be used as a plural noun if context provides the existence of multiple "data" (e.g., "the two data are combined").

As used herein, the term "operative connection" (or "operatively connected") means the direct or indirect connection between devices that allows for interaction in some way (e.g., via the exchange of information). For example, the phrase 'operatively connected' may refer to a direct connection (e.g., a direct wired or wireless connection between devices) or an indirect connection (e.g., multiple wired and/or wireless connections between any number of other devices connecting the operatively connected devices).

Overview and Advantages

In general, this application discloses one or more embodiments of systems and methods for generating emulated functions for peripheral devices in order to facilitate policy-based usage of certain functionalities. Additionally, the systems and methods described herein allow for the unused capacity of underutilized resources to be offered and allocated to virtual machines requesting the functionality. Further, "composite devices" may be virtually generated that combined the functionality of multiple peripheral devices and are offered as a unified device.

In conventional systems, peripheral devices may be designed to have a single user. Accordingly, some of the control of the peripheral device may allow for too much control and/or malicious actions to occur on any part of the peripheral device (e.g., via "physical functions" that can manage a device). Accordingly, when multiple, independent users (e.g., virtual machines) utilize a single peripheral device, certain controls and/or functionalities are disabled (e.g., physical functions) to prevent mixing of data and/or control of the peripheral device. However, disabling such controls may disable other useful features that a user may want to utilize. Accordingly, the user needs to be granted exclusive access to the peripheral device (often resulting in wasted resources), or other user data is placed at risk.

As disclosed in one or more embodiments herein, systems and methods are provided where a device controller intermediary generates "emulated" physical functions that allows for policy-based control of the peripheral device. Virtual machines that attempt to modify one or more properties of the peripheral device may have their actions granted or denied based on the policies that dictate such commands. Accordingly, some management control of the peripheral device is accessible by a virtual machine, even when other, unrelated virtual machines are simultaneously utilizing the same peripheral device.

Separately, in conventional enterprise systems, the allocation of computing resources to two or more users (e.g., virtual machines) may result in the inefficient distribution of those computing resources. As a non-limiting example, a virtual machine may request 7 GB of memory on a single device. Accordingly, the virtual machine is allocated 7 GB of memory from an 8 GB memory device. However, 1 GB of memory is left "stranded" (unallocated and unused) on that memory device. Then, a second virtual machine requests 10 GB of memory evenly split across two memory devices. Accordingly, 5 GB of a second 8 GB memory device is allocated, and 5 GB of a third 8 GB memory device are allocated. This further results in 3 GB of "stranded" memory on the second and third memory devices. In such an example, 7 GB (of the 24 GB memory) is unallocated and split into uneven sizes across three memory devices.

As disclosed in one or more embodiments herein, methods and systems are provided that allow for the identification and utilization of "stranded" computing resources. Virtual machines may access peripheral devices that are underutilized throughout a system. Further such resources may be combined to create "composite devices" that are presented as single device to the virtual machine. Accordingly, computing resources are allocated more efficiently, and virtual machines may be able to access peripheral devices with increased configurability to better suit the specific needs of the virtual machine.

The following sections describes figures which are directed to various non-limiting embodiments of the technology.

—FIG. 1A—

FIG. 1A shows a diagram of a system, in accordance with one or more embodiments. While a specific configuration of a system is shown, other configurations may be used without departing from the disclosed embodiment. Accordingly, embodiments disclosed herein should not be limited to the configuration of devices and/or components shown.

In one or more embodiments, a system may include one or more computing device(s) (e.g., computing device A (101A), computing device N (101N)), connected via a network (100), and one or more virtual machine(s) (e.g., virtual machine A (111A), virtual machine N (111N))

executing on the computing resources (110) of the computing device(s) (101). Each of these components is described below.

In one or more embodiments, a network (100) is a collection of connected network devices (not shown) that allow for the communication of data from one network device to other network devices, or the sharing of resources among network devices. Non-limiting examples of a network (100) include a local area network (LAN), a wide area network (WAN) (e.g., the Internet), a mobile network, any combination thereof, or any other type of network that allows for the communication of data and sharing of computing resources (110) among computing devices (101) operatively connected to the network (100). One of ordinary skill in the art, having the benefit of this detailed description, would appreciate that a network is a collection of operatively connected computing devices that enables communication between those computing devices.

In one or more embodiments, a computing device (101) is hardware that includes any combination of the following components:

(i) processor(s) (102) (described below), (ii) memory (103) (described below), (iii) storage (104) (described below), (iv) peripheral device(s) (105) (described below), (v) internal physical interface(s) (e.g., serial advanced technology attachment (SATA) ports, peripheral component interconnect (PCI) ports, PCI express (PCIe) ports, next generation form factor (NGFF) ports, M.2 ports, etc.), and/or (vi) external physical interface(s) (e.g., small form-factor pluggable (SFP) ports, universal serial bus (USB) ports, recommended standard (RS) serial ports, audio/visual ports, etc.).

Non-limiting examples of a computing device (101) include a general purpose computer (e.g., a personal computer, desktop, laptop, tablet, smart phone, etc.), a network device (e.g., switch, router, multi-layer switch, etc.), a server (e.g., a blade-server in a blade-server chassis, a rack server in a rack, etc.), a controller (e.g., a programmable logic controller (PLC)), and/or any other type of computing device (101) with the aforementioned capabilities.

In one or more embodiments, a processor (102) is an integrated circuit configured to process computer instructions (e.g., code, algorithms, software). Storage (104) and/or memory (103) may store computer instructions that are executed (e.g., read and processed) by a processor (102). A processor (102) may be a processor core or processor micro-core.

In one or more embodiments, memory (103) is one or more hardware devices capable of storing digital information (e.g., data) in a non-transitory medium. In one or more embodiments, when accessing memory (103), software may be capable of reading and writing data at the smallest units of data normally accessible (e.g., "bytes"). Specifically, memory (103) may include a unique physical address for each byte stored thereon, thereby enabling software to access and manipulate data stored in memory (103) by directing commands to specific physical addresses that is associated with a byte of data (i.e., "random access"). Non-limiting examples of memory (103) devices include flash memory, random access memory (RAM), dynamic RAM (DRAM), static RAM (SRAM), resistive RAM (Re-RAM). In one or more embodiments, memory (103) devices may be volatile or non-volatile.

In one or more embodiments, storage (104) is one or more hardware devices capable of storing digital information (e.g., data) in a non-transitory medium. Non-limiting examples of storage (104) include integrated circuit storage devices (e.g., a solid-state drive (SSD), Non-Volatile Memory Express (NVMe), flash memory, etc.), magnetic storage devices (e.g., a hard disk drive (HDD), floppy disk, tape, diskette, etc.), or optical media (e.g., a compact disc (CD), digital versatile disc (DVD), etc.). In one or more embodiments, prior to reading and/or manipulating data located in storage (104), data may first be copied in "blocks" (instead of "bytes") to other, intermediary storage mediums (e.g., memory (103)) where the data can then be accessed in "bytes".

In one or more embodiments, a peripheral device (105) is any device that operatively connects to an internal or external physical interface of a computing device (101). A peripheral device (105) may be hardware that includes additional capabilities that allow for the computing device (101) to perform additional functionalities (e.g., a graphics processing unit (GPU), data processing unit (DPU), sound card, audio/video capture card, etc.). A peripheral device (105) may be hardware for interfacing with a human user of the computing device (101) (e.g., a mouse, keyboard, monitor, speakers, camera, microphone, touchpad, touchscreen, fingerprint reader, joystick, gamepad, etc.). A peripheral device (105) may be a drive for reading and/or writing to a non-transitory computer readable medium (CRM) (e.g., a compact disc (CD) drive, a floppy disk drive, tape drive, etc.). A peripheral device (105) may be any other input and/or output device (e.g., a printer, scanner, etc.).

In one or more embodiments, a peripheral device (105) may be a communication interface. In one or more embodiments, a communication interface is hardware that provides the capability to send and/or receive data with one or more other computing device(s) (101) via a network (100). A communication interface may communicate via any suitable form of wired interface (e.g., Ethernet, fiber optic, serial communication etc.) and/or wireless interface and utilize one or more protocols for the transmission and receipt of data (e.g., transmission control protocol (TCP)/internet protocol (IP), remote direct memory access (RDMA), Institute of Electrical and Electronics Engineers (IEEE) 801.11, etc.). Non-limiting examples of a communication interface include a network interface card (NIC), a modem, an Ethernet card/adapter, and a Wi-Fi® card/adapter.

In one or more embodiments, a computing resource (110) is any one of the components, or subcomponents, of a computing device (101) (e.g., processor(s) (102), memory (103), storage (104), peripheral device(s) (105), etc.). Computing resources (110) existing across two or more computing devices (101) may be tracked, monitored, and aggregated together and presented as "pool" of computing resources (110) existing in the system. In turn, computing resources (110) may be allocated to software (e.g., virtual machines (111)) for use by that software. Non-limiting examples of a computing resource include a processor (102), a processor thread, any range of memory (103), any blocks on a storage (104) device, and any peripheral device components of subcomponents (e.g., a GPU).

As used herein, "software" means any set of computer instructions, code, and/or algorithms that are used by a computing device (101) to perform one or more specific task(s), function(s), or process(es). A computing device (101) may execute software by reading data from memory (103) and/or storage (104), processing that data via a processor (102), and writing processed data to memory (103) and/or storage (104). Multiple software instances may execute on a single computing device (101) simultaneously.

Further, in one or more embodiments, a single software instance may utilize resources from two or more computing devices (101) simultaneously and may move between computing devices (101), as instructed (e.g., via network (100)).

In one or more embodiments, a virtual machine (111) is software, executing on one or more computing device(s) (101), that provides a virtual environment in which other software (e.g., a program, a process, application, etc.) may execute. In one or more embodiments, a virtual machine (111) is created by a virtual machine manager (e.g., a "hypervisor") that allocates some portion of the computing resources (110) for the virtual machine (111) to execute. The computing resources (110) allocated to a virtual machine (111) may be aggregated from one or more computing device(s) (101) and presented as unified "virtual" resources within the virtual machine (111) (e.g., a virtual processor(s) (112), virtual memory (113), virtual storage (114), and virtual peripheral device(s) (115)). As a non-limiting example, a virtual machine may provide a single virtual processor (112) that utilizes two physical processors (102) that are physically disposed in two separate computing devices (101). As another non-limiting example, memory (103) regions from two or more computing devices (101) may be aggregated and into a single virtual memory (113) region and presented as a continuous memory to software executing in the virtual machine (111). Similarly, virtual storage (114) may be allocated from storage (104) existing in one or more computing device(s) (101); and virtual peripheral device(s) (115) may be allocated from peripheral device(s) (105) existing in one or more computing device(s) (101).

In one or more embodiments, a virtual machine (111) supports the smart data accelerator interface (SDXI) protocol for, memory-to-memory data transfer. Further utilization of the SDXI protocol allows for secure communication over memory channels to, facilitate exposure of the virtual resources (112, 113, 114, 115) and to securely read, write, and process data using those resources. Further, the SDXI protocol allows for the chaining of multiple virtual machines (111) together to allow for a secure "pipeline" of data processing from one virtual machine (111) to another.

—FIG. 1B—

Figure 1B:
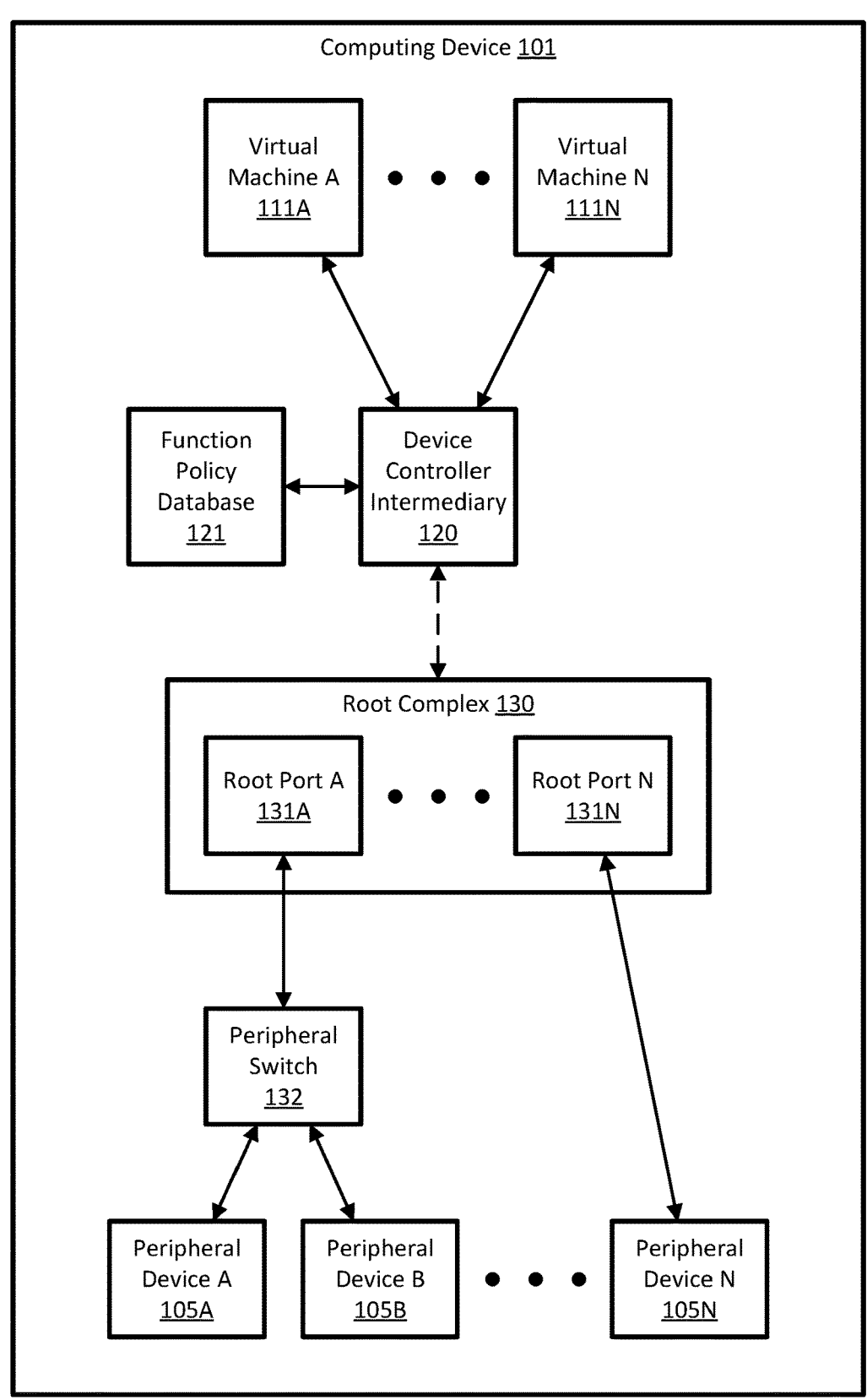
FIG. 1B shows a diagram of a computing device, in accordance with one or more embodiments.

FIG. 1B shows a diagram of a computing device, in accordance with one or more embodiments. While a specific configuration of a system is shown, other configurations may be used without departing from the disclosed embodiment. Accordingly, embodiments disclosed herein should not be limited to the configuration of devices and/or components shown.

In one or more embodiments, a computing device (101) may be executing two or more virtual machines (e.g., virtual machine A (111A), virtual machine N (111N)), a device controller intermediary (120), and storing a function policy database (121). Further, the computing device (101) may include a root complex (130) with one or more root port(s) (e.g., root port A (131A), root port N (131N)) operatively connected to one or more peripheral switch(es) (e.g., peripheral switch (132)). One or more peripheral device(s) (e.g., peripheral device A (105A), peripheral device B (105B), peripheral device N (105N)) may be operatively connected to a root port (131) or to a peripheral switch (132). Each previously-undescribed component is described below.

In one or more embodiments, a root complex (130) is hardware that interfaces with one or more root port(s) (131) and other computing resources (110) (e.g., processor(s) (102), memory (102), storage (104), etc.). The root complex (130) provides the means for communication between computing resources (110) and peripheral devices (105).

In one or more embodiments, a peripheral root port (131) is a physical peripheral interface that allows for the operative connection of a peripheral device (105) (or peripheral switch (132)). A peripheral root port (131) may provide a common interface (e.g., size, pin layout, etc.) and protocol (e.g., PCI, PCIe, M.2, SATA, etc.) allowing a peripheral device (105) to communicate (i.e., send and/or receive data) with the root complex (130) (to other peripheral device(s) (105) and computing resources (110)).

In one or more embodiments, a peripheral switch (132) is hardware that operatively connects to a peripheral root port(s) (131) (or other peripheral switch (132)) in order to increase the number of physical peripheral interfaces in the computing device (101). As a non-limiting example, if a computing device (101) includes only a single peripheral root port (131), but two peripheral devices (105) are desired, a peripheral switch (132) that offers (at least) two physical peripheral interfaces may be added to the computing device (101) and operatively connected to the single peripheral root port (131). Accordingly, two peripheral devices (105) may be operatively connected to the computing device (101) (via a peripheral switch (132)) despite only a single peripheral root port (131) existing in the computing device (101).

In one or more embodiments, a device controller intermediary (120) is component that performs operations related to commands and/or requests made to one or more peripheral device(s) (105). A device controller intermediary (120) may also maintain a function policy database (121) to enforce access restrictions to one or more peripheral device(s) (105). In one or more embodiments, a device controller intermediary (120) may include the functionality to act as a system firmware intermediary (SFI) that may intercept, modify, filter, forward, and/or otherwise alter data emanating from (or destined to) a peripheral device (105) based on peripheral communication channels and/or peripheral communication types. A device controller intermediary (120) may be implemented as software (e.g., executing in user space, the kernel, in the basic input/output system (BIOS)) and/or a computing device (e.g., as a microchip with its own processor, memory, etc.).

In one or more embodiments, a function policy database (121) is a data structure which includes information about one or more function entries (150). Additional details regarding the function policy database (121) may be found in the description of FIG. 1F.

—FIG. 1C—

Figure 1C:
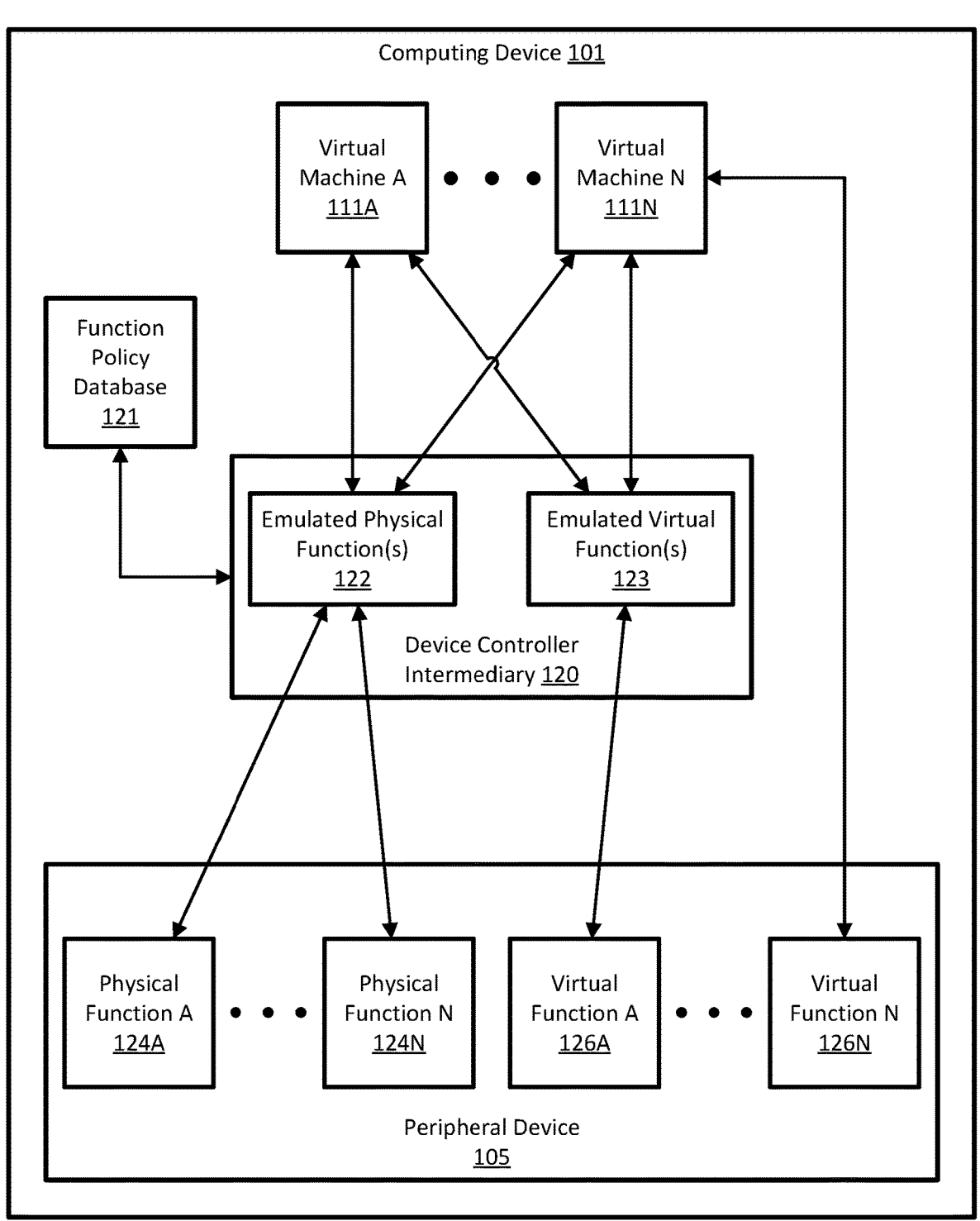
FIG. 1C shows a diagram of a computing device, in accordance with one or more embodiments.

FIG. 1C shows a diagram of a computing device, in accordance with one or more embodiments. While a specific configuration of a system is shown, other configurations may be used without departing from the disclosed embodiment. Accordingly, embodiments disclosed herein should not be limited to the configuration of devices and/or components shown.

In one or more embodiments, a computing device (101) may be executing two or more virtual machines (e.g., virtual machine A (111A), virtual machine N (111N)), a device controller intermediary (120), and storing a function policy database (121). A device controller intermediary (120) may include one or more emulated physical function(s) (122) and one or more emulated virtual function(s) (123). A peripheral device (105) may be operatively connected to one or more components of the device controller intermediary (120). A peripheral device (105) may include one or more physical function(s) (e.g., physical function A (124A), physical function N (124N)) and one or more virtual functions (e.g., virtual function A (126A), virtual function N (126N)). Each previously-undescribed component is described below.

In one or more embodiments, a physical function (124) is a component of a peripheral device (105) which allows for the control of the peripheral device (105) and the creation of one or more virtual function(s) (126). A physical function (124) may accept function commands and perform one or more function operations (156) based on the function command received. Non-limiting examples of function operations (156) performed by a physical function (124) include toggling power to the peripheral device (105), toggling one or more functionalities of the peripheral device (105), changing a mode of the peripheral device (105), partitioning the resources of the peripheral device (105), creating virtual function (126), process input/output requests to utilize the peripheral device (105), changing global setting of the peripheral device (105), and/or any other management operation. A physical function (124) may be implemented as software and/or hardware in the peripheral device (105).

In one or more embodiments, a virtual function (126) is a component of a peripheral device (105) which virtualizes one or more operations of the physical function (124). A virtual function (126) may be created to provide an isolated endpoint to utilize the functionality of the peripheral device (105). As a non-limiting example, virtual machine A (111A) and virtual machine N (111N) may both be actively utilizing the peripheral device (105). However, in order to provide independent paths for each virtual machine (111), there may exists any number of virtual functions (126) that are exclusive to either virtual machine (111) (i.e., any virtual function (126) used by virtual machine A (111A) is not accessible by virtual machine N (111N) and vice versa). Accordingly, any data transmitted through a virtual function (126) is exclusive to the virtual machine (111) that provided the data.

In one or more embodiments, an emulated physical function(s) (122) is a component of the device controller intermediary (120) which allows the device controller intermediary (120) to intercept physical function commands (160) and permit, modify, and/or block those function commands (160) (as dictated by the function policy database (121)). In one or more embodiments, the emulated physical function(s) (122) provide a unique channel for each virtual machine (111) to send physical function commands (160). Emulated physical function(s) (122) may be implemented as hardware and/or software.

In one or more embodiments, an emulated virtual function(s) (123) is a component of the device controller intermediary (120) which allows the device controller intermediary (120) to intercept virtual function commands (160) and permit, modify, and/or block those function commands (160) (as dictated by the function policy database (121)). In one or more embodiments, the emulated virtual function(s) (123) may provide a unique channel for each virtual machine (111) to send virtual function commands (160). Emulated virtual function(s) (123) may be implemented as hardware and/or software. In one or more embodiments, the device controller intermediary (120) may permit a virtual machine (111) to communicate with a virtual function (126) without being processed by an emulated virtual function (123) (e.g., the connection between virtual machine N (111N) and virtual function N (126N)).

—FIG. 1D—

Figure 1D:
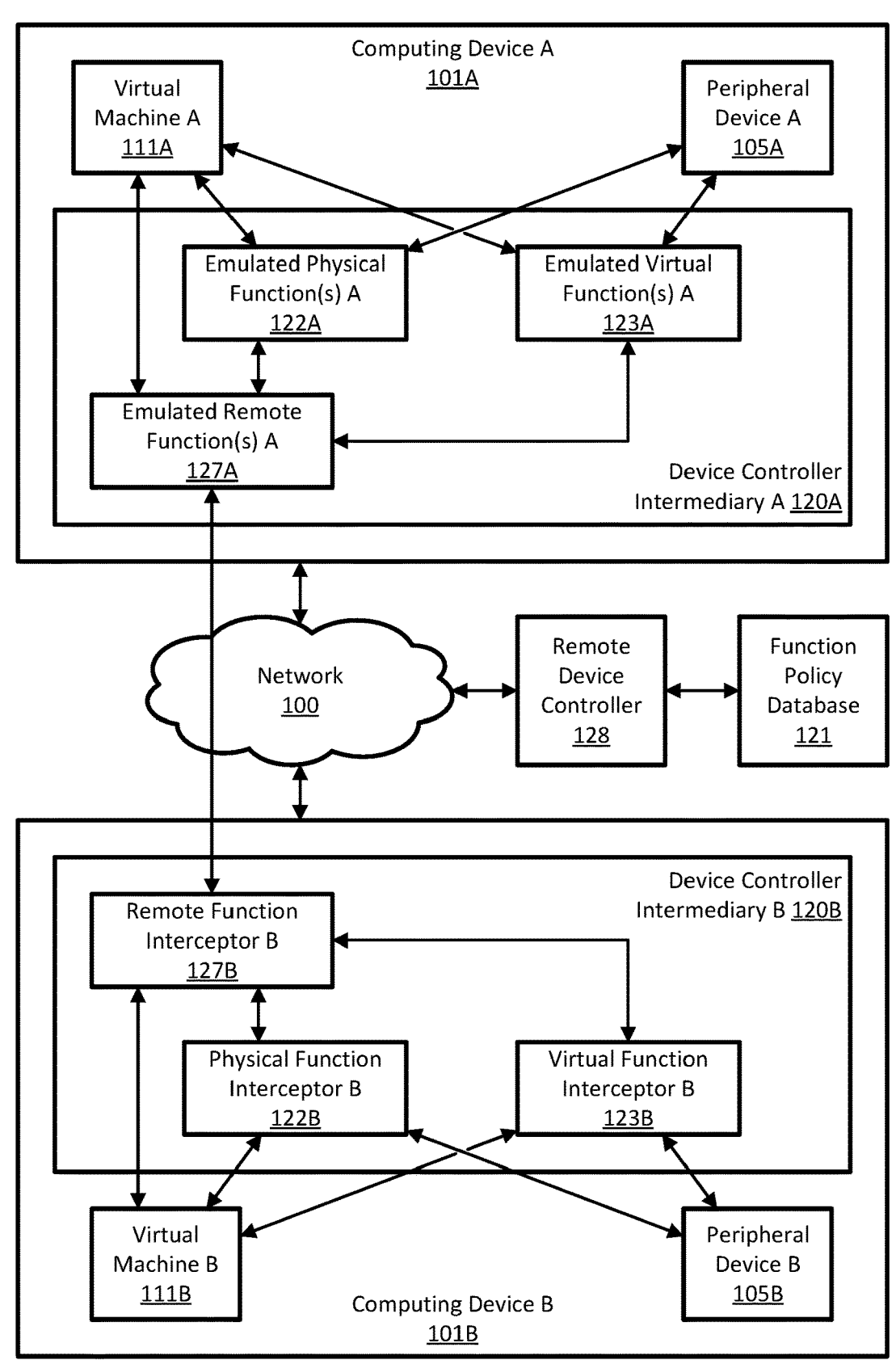
FIG. 1D shows a diagram of a system, in accordance with one or more embodiments.

FIG. 1D shows a diagram of a system, in accordance with one or more embodiments. While a specific configuration of a system is shown, other configurations may be used without departing from the disclosed embodiment. Accordingly, embodiments disclosed herein should not be limited to the configuration of devices and/or components shown.

In one or more embodiments, a system may include one or more computing device(s) (e.g., computing device A (101A), computing device B (101B)), connected via a network (100). Each device controller intermediary (e.g., device controller intermediary A (120A), device controller intermediary B (120B)) may include one or more emulated remote function(s) (emulated remote function(s) A (127A), emulated remote function(s) B (127B)). Further, a remote device controller (128) may be executing on any computing resources (110) of the system. Each previously-undescribed component is described below.

In one or more embodiments, an emulated remote function(s) (127) is a component of the device controller intermediary (120) which allows the device controller intermediary (120) to intercept function commands (160) addressed to a remote peripheral device (105) (a peripheral device (105) disposed in a different computing device (101)) and forward those function commands (160) accordingly. In one or more embodiments, an emulated remote function (127) may provide a unique channel for each virtual machine (111) to send function commands (160) to a remote peripheral device (105). Emulated remote function(s) (127) may be implemented as hardware and/or software.

In one or more embodiments, an emulated remote function (127) may be configured to receive function commands (160) from other emulated remote function(s) (127) in other computing devices (101). When receiving an incoming function command (160) from a remote computing device (101), the emulated remote function (127) may pass the function command (160) to the local emulated physical function(s) (122) or emulated virtual function(s) (123) based on the function type (155) of the function command (160) (i.e., "physical" or "virtual"). An emulated remote function (127) may communicate with another emulated remote function (127) via any protocol over the network (100) (e.g., remote direct memory access (RDMA) over converged ethernet (RoCE)).

In one or more embodiments, a remote device controller (128) is software which manages the access and allocation of peripheral device (105) resources to remote virtual machines (111). In one or more embodiments, a remote device controller may maintain a function policy database (121) to track the allocation and utilization of peripheral devices (105) and to enforce any policies specified therein. A remote device controller (128) may initiate the creation, modification, and elimination of emulated remote function(s) (127) in a system.

—FIG. 1E—

Figure 1E:
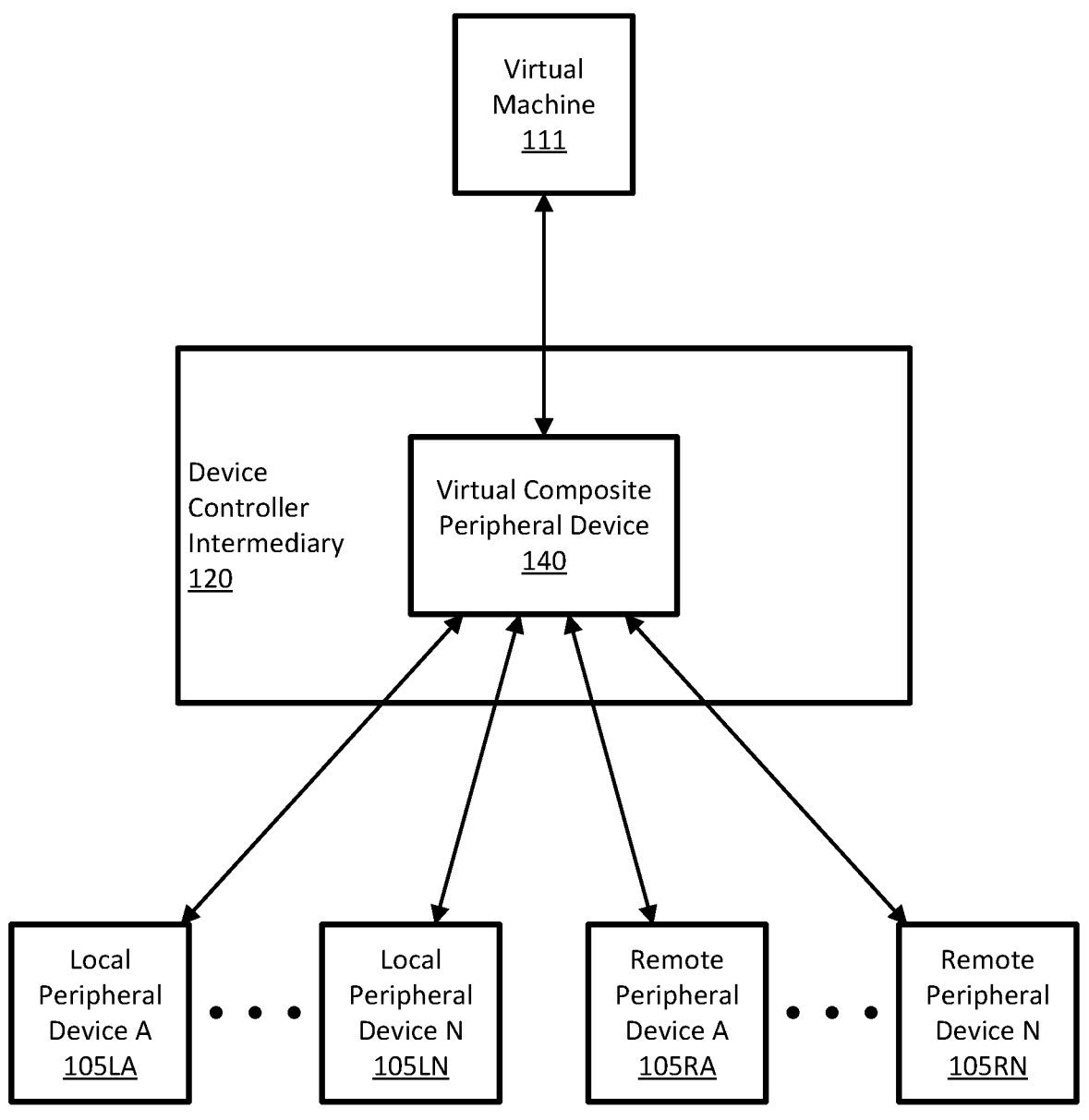
FIG. 1E shows a diagram of a system with a virtual composite peripheral device, in accordance with one or more embodiments.

FIG. 1E shows a diagram of a system with a virtual composite peripheral device, in accordance with one or more embodiments. While a specific configuration of a system is shown, other configurations may be used without departing from the disclosed embodiment. Accordingly, embodiments disclosed herein should not be limited to the configuration of devices and/or components shown.

In one or more embodiments, a system may include one or more a virtual machine (111) that is utilizing one or more local peripheral device(s) (e.g., local peripheral device A (105LA), local peripheral device N (105LN)) and/or one or more remote peripheral device(s) (e.g., remote peripheral device A (105RA), remote peripheral device N (105RN)). The virtual machine (111) may be utilizing the peripheral devices (105) via a virtual composite peripheral device (140) created by the device controller intermediary (120). Each previously-undescribed component is described below.

In one or more embodiments, a virtual composite peripheral device (140) is a logical device generated by a device controller intermediary (120) which aggregates the functionalities of two or more peripheral devices (105). In one or more embodiments, a device controller intermediary (120) may generate a virtual composite peripheral device (140) to present the existence of a single peripheral device (105) capable of performing multiple disparate functions-even though there is no single peripheral device (105) in the system that can perform the advertised functions (or such peripheral devices (105) may be unavailable).

As a non-limiting example, a virtual machine (111) may request allocation of a NIC that can support 10 Gbps Ethernet and includes onboard encryption capabilities. However, the device controller intermediary (120) is unable to locate an available peripheral device (105) with those capabilities. However, the device controller intermediary (120) is able to locate four NICs that support 2.5 Gbps Ethernet and a GPU that can encrypt the data at sufficient speeds. In turn, the device controller intermediary (120) creates virtual functions (126) on each of those five peripheral devices (105) (the four NICs and one GPU) and aggregates their functionalities into a single composite peripheral device (140).

—FIG. 1F—

Figure 1F:
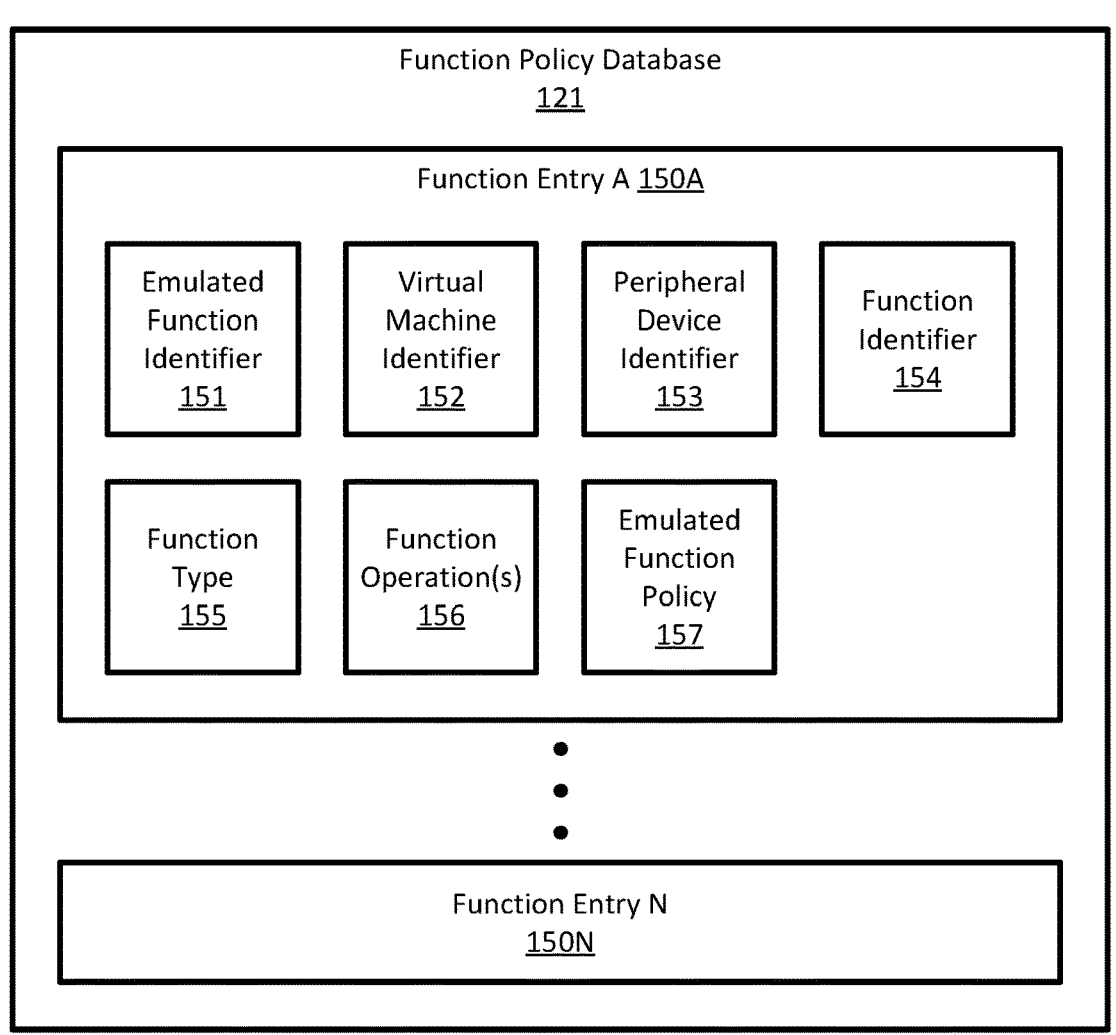
FIG. 1F shows a diagram of a function policy database, in accordance with one or more embodiments.

FIG. 1F shows a diagram of a function policy database, in accordance with one or more embodiments. While a specific configuration of a creation request is shown, other configurations may be used without departing from the disclosed embodiment. Accordingly, embodiments disclosed herein should not be limited to the configuration of devices and/or components shown.

In one or more embodiments, a function policy database (121) is a data structure that includes one or function entries (e.g., function entry A (150A), function entry N (150N)). In one or more embodiments, a function entry (150) is a data structure that includes any combination, of the following data:

(i) an emulated function identifier (151) that uniquely identifies a single emulated physical function (122) or emulated virtual function (123) (non-limiting examples of an identifier include a tag, an alphanumeric entry, a filename, and a row number in table). In one or more embodiments, the emulated function identifier may include some means allowing the device controller intermediary (120) to quickly identify if the emulated function is local (or remote) (e.g., a matching prefix, tag, etc.), (ii) a virtual machine identifier (152) that uniquely identifies a single virtual machine (111), (iii) a peripheral device identifier (153) that uniquely identifies a single peripheral device (105), (iv) a function identifier (154) that uniquely identifies a single physical function (124) or virtual function (126), (v) a function type (155) (i.e., "physical" or "virtual"), (vi) function operation(s) (156) that describe the processes that may be performed by the function (124, 126) (e.g., one or more capabilities of the peripheral device), and/or (vii) an emulated function policy (157) (described below).

In one or more embodiments, an emulated function policy (157) that includes one or more restrictions, limitations, and/or constraints regarding the usage of the function (124, 126). An emulated function policy (157) may specify that certain physical function (124) function operations (156) are prohibited (e.g., power cycling the device, allocating already-allocated virtual functions (126), changing properties of the peripheral device (105) that would affect all virtual functions (126)). In one or more embodiments, an emulated function policy (157) may prevent a virtual machine (111) from performing any function operation (156) that would affect the virtual function(s) (123) used by another virtual machine (111) (e.g., any device-wide modification of the peripheral device (105)). In one or more embodiments, an emulated function policy (157) may allow a virtual machine (111) to perform a function operation (156) that affects the virtual function(s) (126) used by another virtual machine (111), if that virtual machine (111) sending the function command (160) is permitted (e.g., where two or more virtual machines (111) are operated by the same entity).

—FIG. 1G—

Figure 1G:
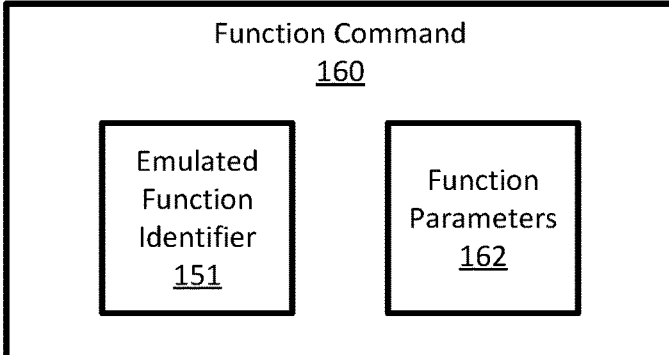
FIG. 1G shows a diagram of a function command, in accordance with one or more embodiments.

FIG. 1G shows a diagram of a function command, in accordance with one or more embodiments. While a specific configuration of a creation request is shown, other configurations may be used without departing from the disclosed embodiment. Accordingly, embodiments disclosed herein should not be limited to the configuration of devices and/or components shown.

In one or more embodiments, a function command (160) is a data structure that includes an emulated function identifier (151) and/or function parameters (162). In one or more embodiments, function parameters (162) include one or more properties of the function command (160) including, one or more function operation(s) (156) to be performed, unprocessed data (i.e., "input data"), the location of unprocessed, and/or the location to store processed data (i.e., "output data").

—FIG. 2A—

Figure 2A:
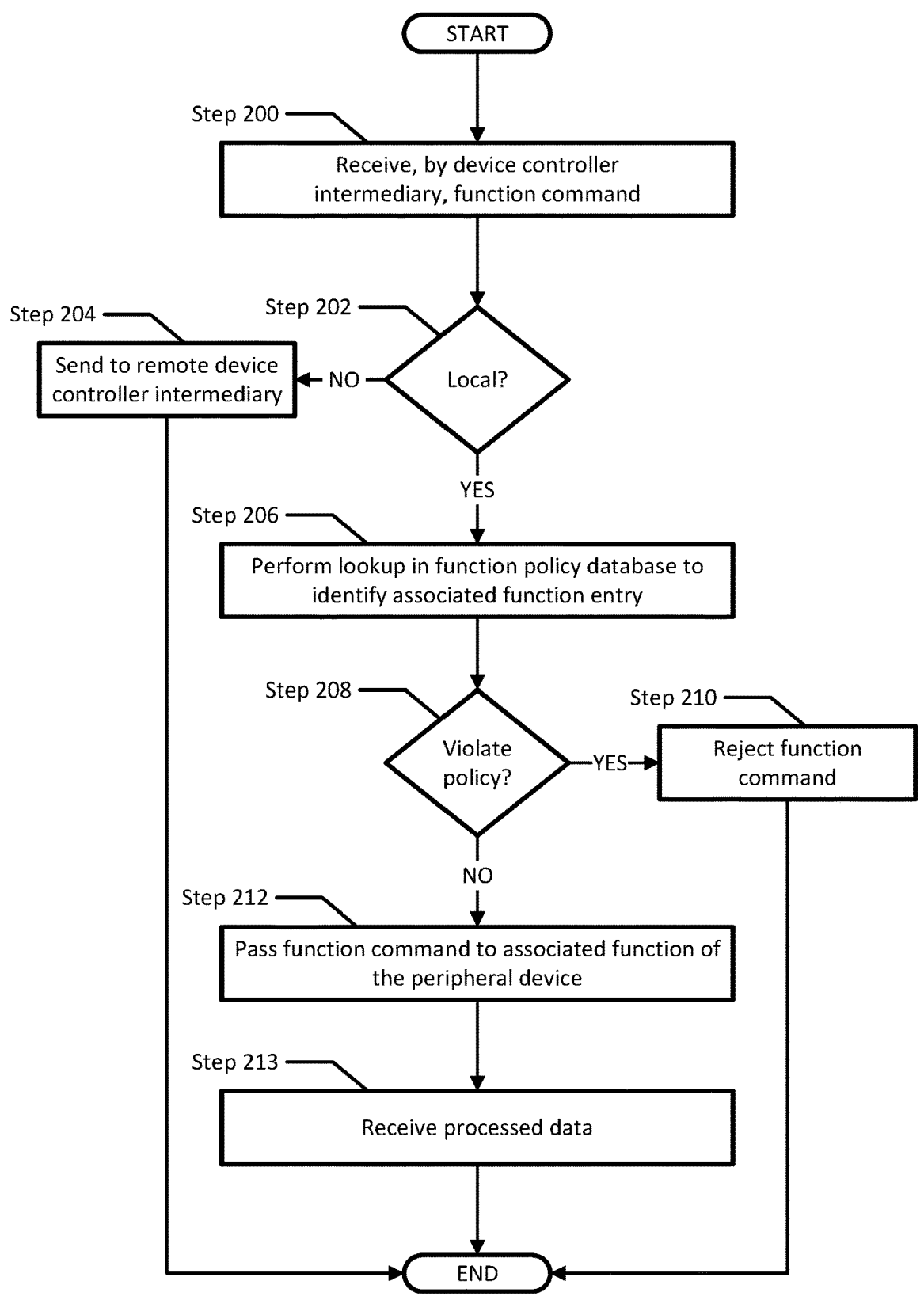
FIG. 2A shows a flowchart of a method for processing a function command, in accordance with one or more embodiments.

FIG. 2A shows a flowchart of a method for processing a function command, in accordance with one or more embodiments. All or a portion of the method shown may be performed by the virtual machine manager. However, another component of the system may perform this method without departing from the embodiments disclosed herein. While the various steps in this flowchart are presented and described sequentially, one of ordinary skill in the relevant art (having the benefit of this detailed description) would appreciate that some or all of the steps may be executed in different orders, combined, or omitted, and some or all steps may be executed in parallel.

In Step 200, the device controller intermediary receives a function command from a virtual machine. In one or more embodiments, the device controller intermediary receives the function command at an emulated function (emulated virtual function, emulated physical function, emulated remote function). The function command may include an emulated function identifier that specifies an emulated function created by the device controller intermediary. In one or more embodiments, the function command may be sent by a remote virtual machine and is forwarded to the device controller intermediary via a remote device controller intermediary.

In Step 202, the device controller intermediary makes a determination if the emulated function identifier, in the function command, specifies a local emulated function. In one or more embodiments, the emulated function identifier may include some means allowing the device controller intermediary to quickly identify if the evaluation function is local (or remote) without having to perform a lookup in the function policy database.

If the device controller intermediary determines that the emulated function identifier specifies a local emulated function (Step 202-YES), the method proceeds to Step 206. If, however, the device controller intermediary determines that the emulated function identifier does not specify a local emulated function (Step 202-NO), the method proceeds to Step 204.

In Step 204, the device controller intermediary sends the function command to a remote device controller intermediary (executing in a computing device that hosts the peripheral device being accessed). In one or more embodiments, the device controller intermediary may communicate with other device controller intermediaries via a remote device controller that manages the remote usage of peripheral devices.

In Step 206, the device controller intermediary performs a lookup in the function policy database to identify an associated function entry. In one or more embodiments, the device controller intermediary identifies a function entry with an emulated function identifier that matches the emulated function identifier received in the function command.

In Step 208, the device controller intermediary makes a determination if the function parameters (of the function command) violate the emulated function policy (of the function entry). In one or more embodiments, the device controller intermediary makes the determination by comparing the requested function operation, or properties thereof, against the emulated function policy.

If the device controller intermediary determines that the function parameters violate the emulated function policy (Step 208-YES), the method proceeds to Step 210. If, however, the device controller intermediary determines that the function parameters do not violate the emulated function policy (Step 208-NO), the method proceeds to Step 212.

In Step 210, the device controller intermediary rejects the function command sent by the virtual machine. In one or more embodiments, the device controller intermediary may stop processing the function command in response to the determination that the function parameters violate the emulated function policy. Further, the device controller intermediary may generate a rejection message, indicating the function command was rejected, and send the rejection message to the virtual machine.

In Step 212, the device controller intermediary passes the function command to the function (physical function or virtual function) identified by the function identifier in the function entry. In turn, the physical/virtual function of the peripheral device performs the function operation specified in the function command.

In Step 213, the device controller intermediary receives processed data, from the peripheral device, in response to the function command. In one or more embodiments, the device controller intermediary passes the processed data to the virtual machine from the same emulated function that received the function command (in Step 200). In one or more embodiments, the processed data may be any data generated and/or processed by the peripheral device.

—FIG. 2B—

Figure 2B:
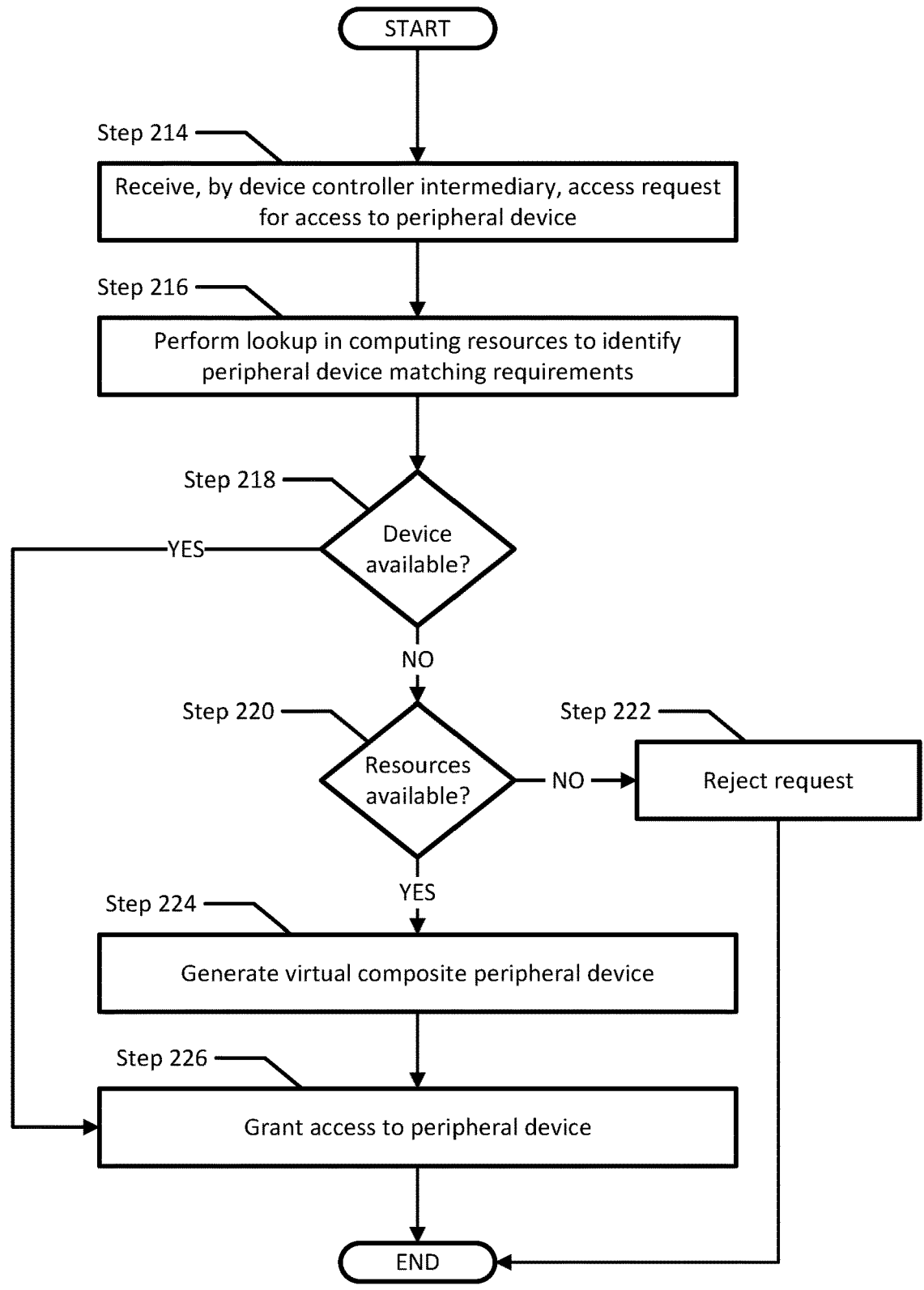
FIG. 2B shows a flowchart of a method generating a virtual composite peripheral device, in accordance with one or more embodiments.

FIG. 2B shows a flowchart of a method generating a virtual composite peripheral device, in accordance with one or more embodiments. All or a portion of the method shown may be performed by the virtual machine manager. However, another component of the system may perform this method without departing from the embodiments disclosed herein. While the various steps in this flowchart are presented and described sequentially, one of ordinary skill in the relevant art (having the benefit of this detailed description) would appreciate that some or all of the steps may be executed in different orders, combined, or omitted, and some or all steps may be executed in parallel.

In Step 214, the device controller intermediary receives an access request from a virtual machine. The access request may include a request to access a peripheral device that is capable of performing one or more function operations(s) specified in the access request.

In Step 216, the device controller intermediary performs a lookup to identify a peripheral device that satisfies the capabilities specified in the access request. In one or more embodiments, the device controller intermediary may perform a lookup in the in the function policy database, or another database associated with the computing resources of the system, in order to identify an available peripheral device.

In Step 218, the device controller intermediary makes a determination if a peripheral device is available that satisfies the capabilities specified in the access request. If the device controller intermediary determines that a peripheral device satisfying the access request is available (Step 218-YES), the method proceeds to Step 226. If, however, the device controller intermediary determines that a peripheral device satisfying the access request is not available (Step 218-NO), the method proceeds to Step 220.

In Step 220, the device controller intermediary makes a determination if there are sufficient resources available in the system to perform the requested function operations from two or more peripheral devices. In one or more embodiments, the device controller intermediary looks in the function policy database, or another database associated with the computing resources of the system, in order to identify an peripheral device that are capable of performing some or all of the function operations. The peripheral devices may be located in the local computing device and/or in remote computing devices.

If the device controller intermediary determines that there are sufficient resources available from multiple peripheral devices (Step 220-YES), the method proceeds to Step 224. If, however, the device controller intermediary determines that there are not sufficient resources available from multiple peripheral devices (Step 220-NO), the method proceeds to Step 222.

In Step 222, the device controller intermediary rejects the access request sent by the virtual machine. In one or more embodiments, the device controller intermediary may generate a rejection message, indicating the access request was rejected, and send the rejection message to the virtual machine.

In Step 224, the device controller intermediary generates a composite peripheral device using the resources of multiple peripheral devices to perform the requested function operations. In one or more embodiments, the device controller intermediary generates one or more emulated functions for each of the peripheral devices and presents those emulated functions to the virtual machine as though there is a single, local peripheral device capable of performing the requested function operations.

In Step 226, the device controller intermediary grants access to the peripheral device. In one or more embodiments, the device controller intermediary may generate one or more emulated physical and/or virtual functions for the virtual machine to communicate with the peripheral device. The device controller intermediary may generate, and send, a message to the virtual machine that access to the peripheral device was granted and additional information related to one or more emulated functions that may have been created.
—FIG. 3A—

Figure 3A:
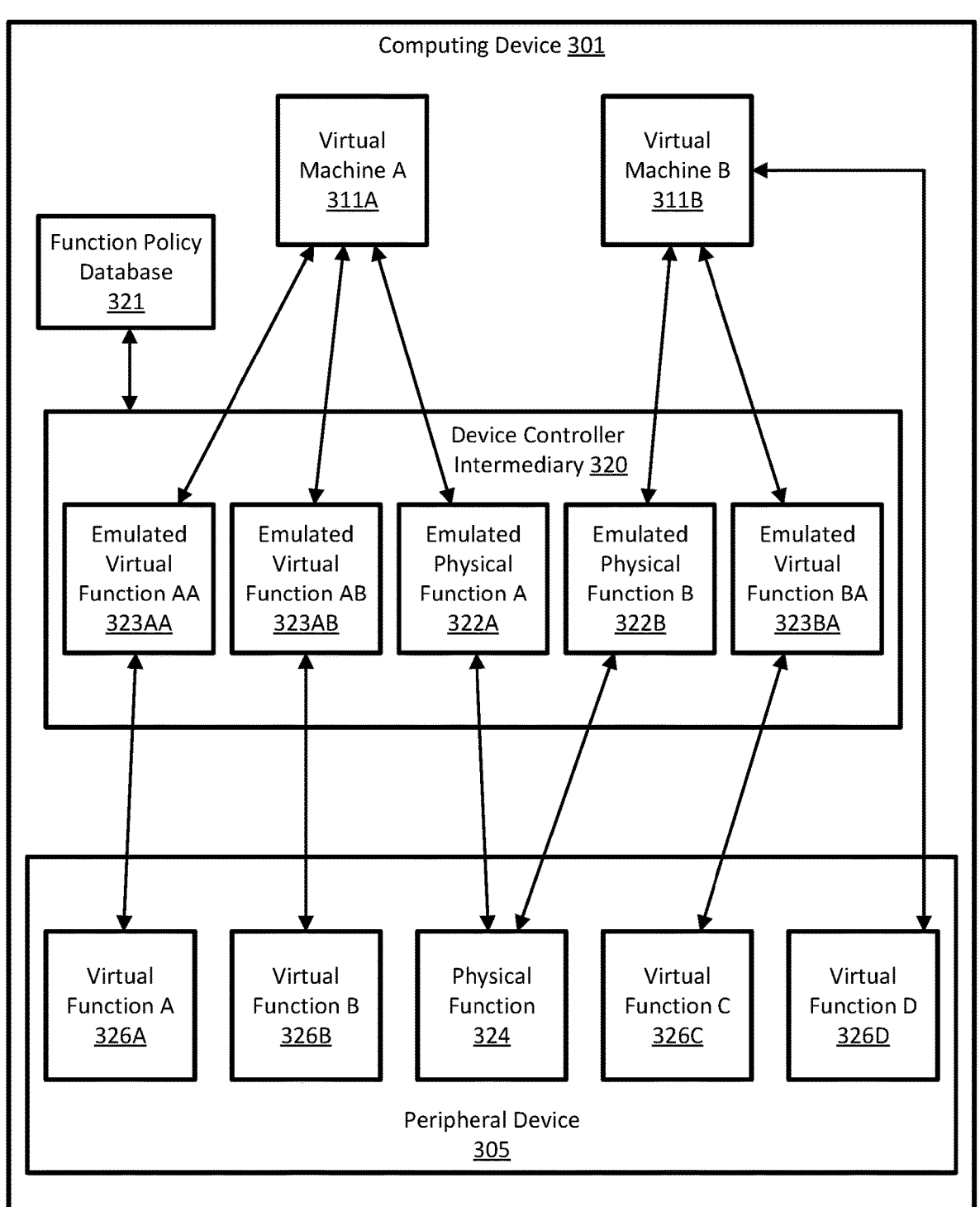
FIG. 3A shows an example of a computing device, in accordance with one or more embodiments.

FIG. 3A shows an example of a computing device, in accordance with one or more embodiments. As shown in FIG. 3A, the computing device (301) includes two virtual machines (virtual machine A (311A), virtual machine B (3111B)) sharing a single peripheral device (305) via a device controller intermediary (320). The example is not intended to limit the scope of the technology.

The peripheral device (305) includes a single physical function (324) and four virtual functions (virtual function A (326A), virtual function B (326B), virtual function C (326C), virtual function D (326D)). The physical function (324) is used by both virtual machine A (311A) and virtual machine B (311B) via emulated physical function A (322A) and emulated physical function B (322B), respectively. Further, virtual machine A (311A) indirectly utilizes virtual function A (326A) via emulated virtual function AA (323AA), and virtual function B (326B) via emulated virtual function AA (323AB). Similarly, virtual machine B (311B) indirectly utilizes virtual function C (326C) via emulated virtual function BA (323BA). Yet, virtual machine B (311B) directly utilizes virtual function D (326D) without traversing the device controller intermediary (320). The device controller intermediary (320) uses the function policy database (321) to manage the emulated functions (322, 323) and enforce the emulated function policies (not shown) specified therein.
—FIG. 3B—

Figure 3B:
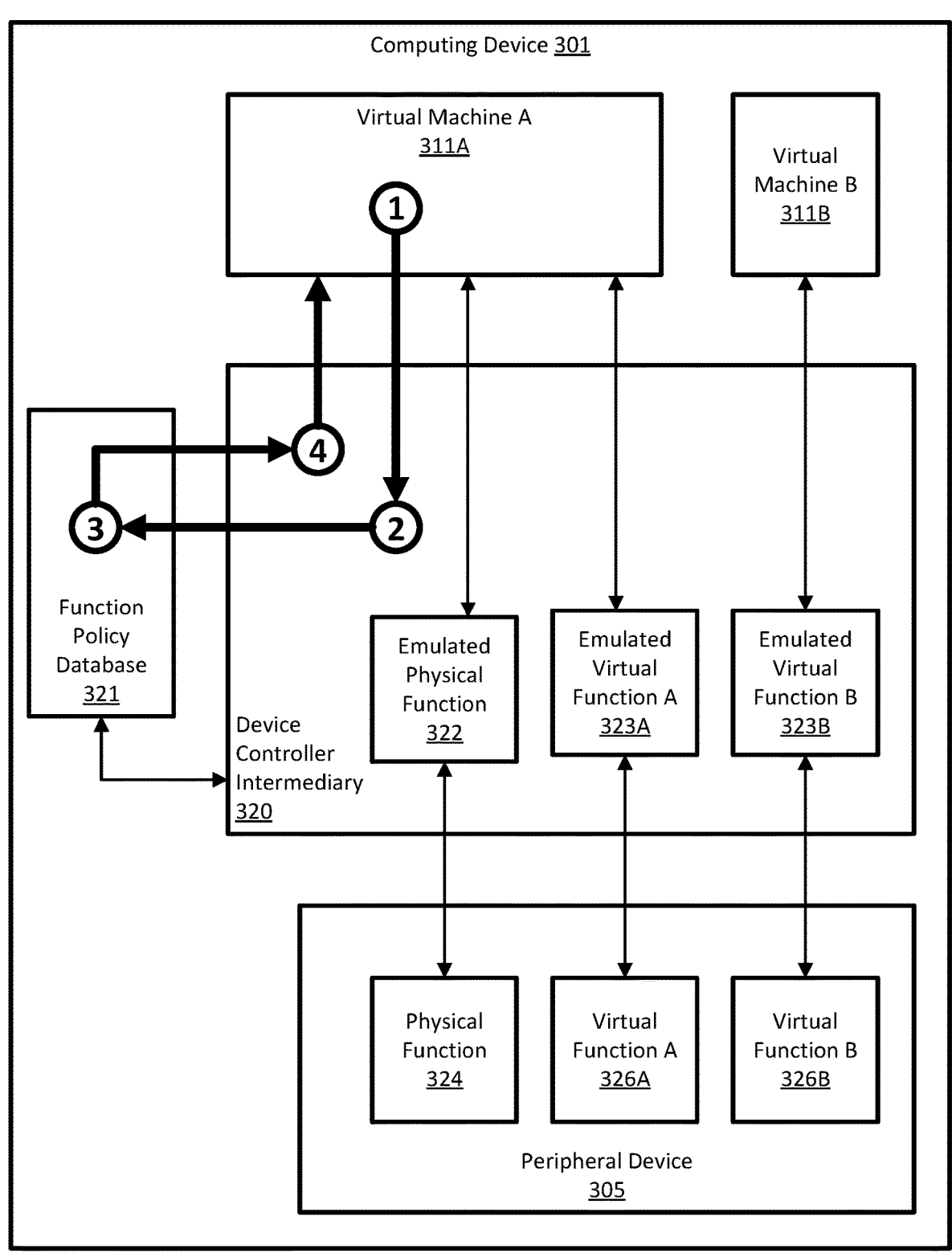
FIG. 3B shows an example of a computing device and the process of rejecting a function command, in accordance with one or more embodiments.

FIG. 3B shows an example of a computing device and the process of rejecting a function command, in accordance with one or more embodiments. As shown in FIG. 3B, the computing device (301) includes two virtual machines (virtual machine A (311A), virtual machine B (311B)) sharing a single peripheral device (305) via a device controller intermediary (320). The example is not intended to limit the scope of the technology.

The peripheral device (305) includes a single physical function (324) and two virtual functions (virtual function A (326A), virtual function B (326B)). The physical function (324) is used by virtual machine A (311A) via emulated physical function (322). Further, virtual machine A (311A) indirectly utilizes virtual function A (326A) via emulated virtual function A (323A). Similarly, virtual machine B (311B) indirectly utilizes virtual function B (326B) via emulated virtual function B (323B). The device controller intermediary (320) uses the function policy database (321) to manage the emulated functions (322, 323) and enforce the emulated function policies (not shown) specified therein.

Consider a scenario where, at (1), virtual machine A (311A) sends a function command, to the device controller intermediary (320), to re-allocate virtual function B (326B) to itself (virtual machine A (311A)). At (2), the device controller intermediary (320) receives the function command and makes a first determination that the emulated function identifier (of the function command) identifies the emulated physical function (322) existing locally on the device controller intermediary (320).

In turn, at (3), the device controller intermediary (320) performs a lookup in the function policy database (321) to identify a function entry with a matching emulated function identifier. Once identified, the device controller intermediary (320) makes a second determination that the requested function operation violates the emulated function policy of the function entry. Specifically, the device controller intermediary (320) determines that the requested function operation attempts to modify a virtual function (virtual function B (326B)) that is associated with a different virtual machine (virtual machine B (311B)).

At (4), the device controller intermediary (320) rejects the function command (in response to the second determination)

and informs virtual machine A (311A) that the function command has been rejected by sending a rejection message to virtual machine A (311A). Accordingly, although virtual machine A (311A) has some ability to utilize the physical function (324), the device controller intermediary (320) limits the usage of the physical function (324) by denying access and modifications to virtual functions (e.g., virtual function B (326B)) not associated with the virtual machine A (111A).

—FIG. 3C—

Figure 3C:
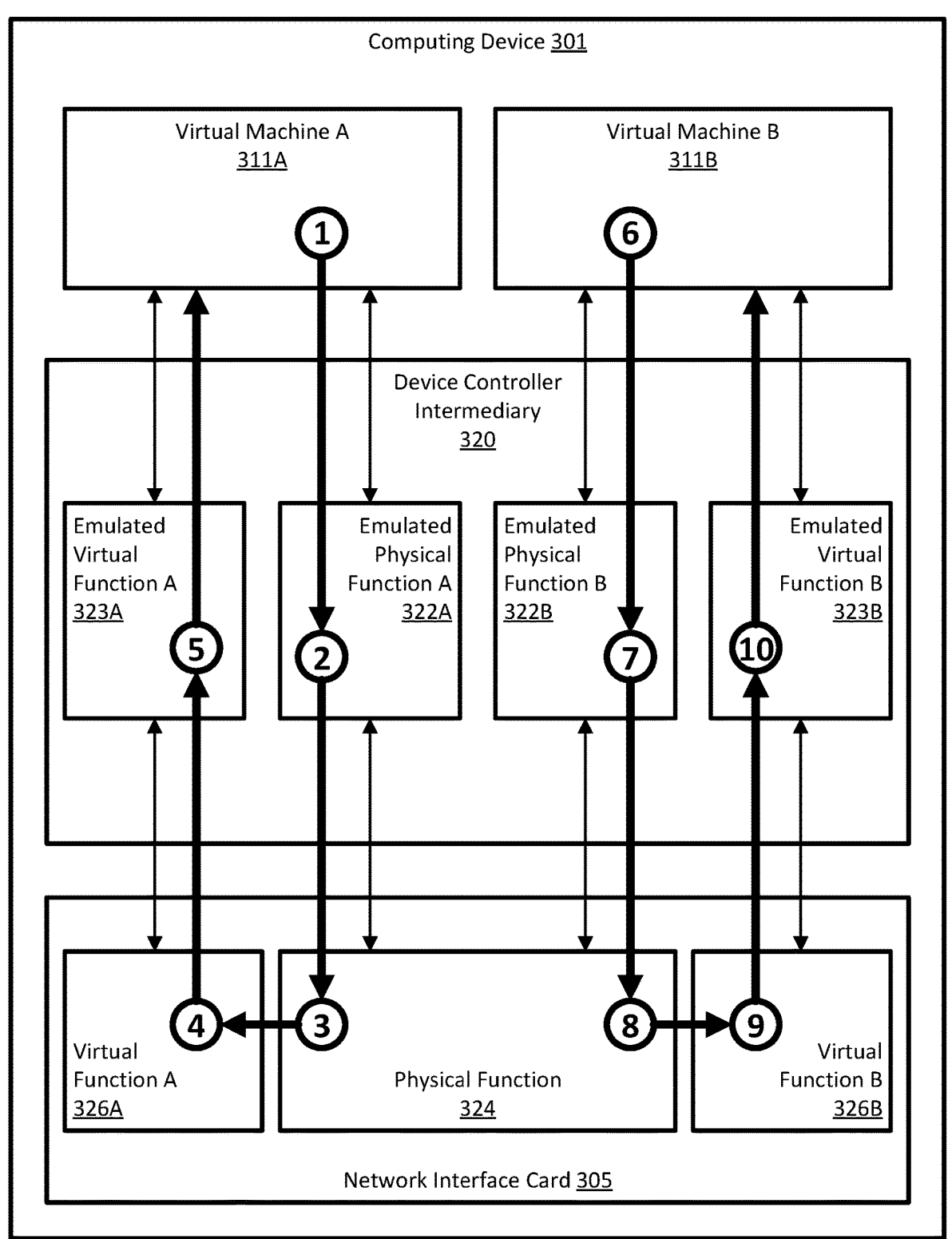
FIG. 3C shows an example of a computing device and the process of multiple virtual machines using the same physical function, in accordance with one or more embodiments.

FIG. 3C shows an example of a computing device and the process of multiple virtual machines using the same physical function, in accordance with one or more embodiments. As shown in FIG. 3C, the computing device (301) includes two virtual machines (virtual machine A (311A), virtual machine B (311B)) sharing a single network interface card (305) via a device controller intermediary (320). The example is not intended to limit the scope of the technology.

The peripheral device (305) includes a single physical function (324) and two virtual functions (virtual function A (326A), virtual function B (326B)). The physical function (324) is used by virtual machine A (311A) and virtual machine B (311B) via emulated physical function A (322A) and emulated physical function B (322B), respectively. Further, virtual machine A (311A) indirectly utilizes virtual function A (326A) via emulated virtual function A (323A). Similarly, virtual machine B (311B) indirectly utilizes virtual function B (326B) via emulated virtual function B (323B). The device controller intermediary (320) uses the function policy database (not shown) to manage the emulated functions (322, 323) and enforce the emulated function policies specified therein.

Consider a scenario where, at (1), virtual machine A (311A) sends a function command, to the device controller intermediary (320), with function parameters to re-allocate virtual function A (326A) to increase the connection bandwidth capacity (e.g., from 5 Gbps to 7.5 Gbps). At (2), the device controller intermediary (320) receives the function command and makes a first determination that the emulated function identifier (of the function command) identifies the emulated physical function A (322A) existing locally on the device controller intermediary (320). The device controller intermediary (320) performs a lookup in the function policy database (not shown) to identify a function entry with a matching emulated function identifier. Once identified, the device controller intermediary (320) makes a second determination that the requested function operation does not violate the emulated function policy of the function entry. Accordingly, the device controller intermediary (320) forwards the function command to the physical function (324) of the network card interface (305). At (3), the physical function receives the function command and performs the function operation included in the function command (increasing the connection bandwidth capacity of virtual function A (326A) from 5 Gbps to 7.5 Gbps). At (4), virtual function A (326A) generates a status message indicating that the connection bandwidth capacity of is at 7.5 Gbps. At (5), the status message is intercepted by emulated virtual function A (323A) and is forwarded onto virtual machine A (311A).

At (6), virtual machine B (311B) sends a function command to the device controller intermediary (320), with function parameters to terminate virtual function B (326B) and release the allocated resources. At (7), the device controller intermediary (320) receives the function command and makes a first determination that the emulated function identifier (of the function command) identifies the emulated physical function B (322B) existing locally on the device controller intermediary (320). The device controller intermediary (320) performs a lookup in the function policy database (not shown) to identify a function entry with a matching emulated function identifier. Once identified, the device controller intermediary (320) makes a second determination that the requested function operation does not violate the emulated function policy of the function entry. Accordingly, the device controller intermediary (320) forwards the function command to the physical function (324) of the network card interface (305). At (8), the physical function receives the function command and performs the function operation included in the function command (terminating virtual function B (326B)). At (9), virtual function B (326B) generates a status message indicating that the connection is closed. At (10), the status message is intercepted by emulated virtual function B (323B) and is forwarded onto virtual machine B (3111B). Thereafter, virtual function B (326B) and emulated virtual function B (323B) are terminated.

As seen in the example of FIG. 3C, two virtual machines (311A, 311B) both utilize the same physical function (324) to perform function operations via the device controller intermediary (320). Thus, virtual machines (311) may still utilize the functionalities of the physical function (324) but are prevented from performing malicious function operations on the virtual functions (326) associated with other virtual machines (311).

—FIG. 3D—

Figure 3D:
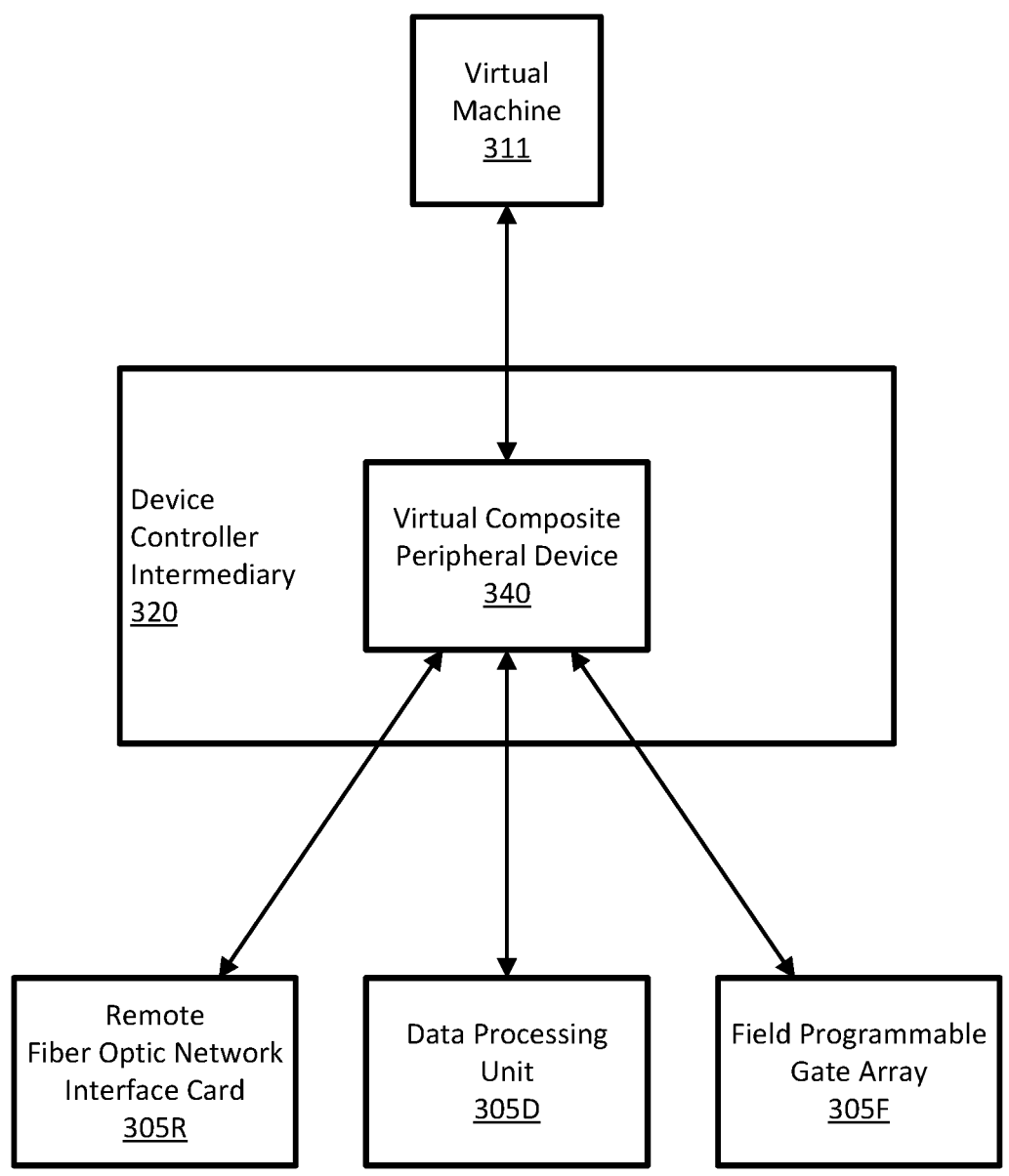
FIG. 3D shows an example of a system and a virtual composite peripheral device, in accordance with one or more embodiments.

FIG. 3D shows an example of a system and a virtual composite peripheral device, in accordance with one or more embodiments. As shown in FIG. 3D, the system includes a virtual machine (311), a device controller intermediary (320) that intermediates access to a remote fiber optic network interface card (305R), a data processing unit (305D), and a field programmable gate array (305F). The example is not intended to limit the scope of the technology.

Consider a scenario where virtual machine (311) requests access (via an access request) to a fiber optic network interface card with sufficient resources to perform a proprietary process, requiring a field programmable gate array, and further applying a specified encryption technique to the data. The device controller intermediary (320) performs a lookup in the computing resources (not shown) to identify such a peripheral device. However, the device controller intermediary (320) is unable to locate a peripheral device with the specified parameters.

Instead of reporting back to the virtual machine (311) that no such peripheral device is available, the device controller intermediary (320) identifies three other available peripheral devices capable of performing the requested function operations. Specifically, the device controller intermediary (320) identifies a remote fiber optic network interface card (305R), a data processing unit (305D), and a field programmable gate array (305F). Further, the remote fiber optic network interface card (305R) is installed in a remote computing device (not shown) (a computing device that is not executing the virtual machine (311)).

The device controller intermediary (320) then generates virtual functions on each peripheral device (305) required to perform the specified operations and further generates emulated virtual functions in the device controller intermediary (320) for each of those virtual functions (to facilitate communication from the virtual machine to the peripheral devices (305)). The device controller intermediary (320)

then packages the emulated virtual functions into the virtual composite peripheral device (340) and grants access by the virtual machine (311).

What is claimed is:

1. A method for processing a function command for a peripheral device, the method comprising:

obtaining, by a device controller intermediary, a function command from a virtual machine, wherein the function command is for function operations to be performed on a peripheral device and wherein the function command comprises function parameters that include properties of the function command, the function operations, and a location of unprocessed data;

making a first determination that a plurality of peripheral devices including at least one remote peripheral device have sufficient resources to perform the function operations of the function command, wherein the at least one remote peripheral device is in a different computing device from the virtual machine and the device controller intermediary;

generating a composite peripheral device using resources of the plurality of peripheral devices to perform the function operations of the function command;

generating, after generating the composite peripheral device, emulated functions for the virtual machine to communicate with the plurality of peripheral devices;

forwarding the function command to the plurality of peripheral devices that make up the composite peripheral device;

in response to forwarding the function command:

receiving processed data from the plurality of peripheral devices, wherein the unprocessed data is processed by the plurality of peripheral devices; and providing the processed data to the virtual machine using the emulated functions from the function command that presents the processed data as coming from a single peripheral device.

2. The method of claim 1, wherein the function command is received at an emulated remote function of the device controller intermediary.

3. The method of claim 2, wherein the function command is forwarded to a physical function of the remote peripheral device, wherein the physical function is associated with the emulated remote function.

4. The method of claim 2, wherein the function command is forwarded to virtual functions of the plurality of peripheral devices, wherein the virtual functions are associated with the emulated remote function.

5. The method of claim 2, wherein the composite peripheral device further comprises emulated virtual functions associated with the plurality of peripheral devices.

6. The method of claim 5, wherein the device controller intermediary presents, to the virtual machine, the emulated remote function and the emulated virtual functions as belonging to a same peripheral device.

7. A non-transitory computer readable medium comprising instructions which, when executed by a processor, enables the processor to perform a method for processing a function command for a peripheral device, the method comprising:

obtaining, by a device controller intermediary, a function command from a virtual machine, wherein the function command is for function operations to be performed on a peripheral device and wherein the function command comprises function parameters that include properties of the function command, the function operations, and a location of unprocessed data;

making a first determination that a plurality of peripheral devices including at least one remote peripheral device have sufficient resources to perform the function operations of the function command, wherein the at least one remote peripheral device is in a different computing device from the virtual machine and the device controller intermediary;

generating a composite peripheral device using resources of the plurality of peripheral devices to perform the function operations of the function command;

generating, after generating the composite peripheral device, emulated functions for the virtual machine to communicate with the plurality of peripheral devices;

forwarding the function command to the plurality of peripheral devices that make up the composite peripheral device;

in response to forwarding the function command:

receiving processed data from the plurality of peripheral devices, wherein the unprocessed data is processed by the plurality of peripheral devices; and providing the processed data to the virtual machine using the emulated functions from the function command that presents the processed data as coming from a single peripheral device.

8. The non-transitory computer readable medium of claim 7, wherein the function command is received at an emulated remote function of the device controller intermediary.

9. The non-transitory computer readable medium of claim 8, wherein the function command is forwarded to a physical function of the remote peripheral device, wherein the physical function is associated with the emulated remote function.

10. The non-transitory computer readable medium of claim 8, wherein the function command is forwarded to virtual functions of the plurality of peripheral devices, wherein the virtual functions are associated with the emulated remote function.

11. The non-transitory computer readable medium of claim 8, wherein the composite peripheral device further comprises emulated virtual functions associated with the plurality of peripheral devices.

12. The non-transitory computer readable medium of claim 11, wherein the device controller intermediary presents, to the virtual machine, the emulated remote functions and the emulated virtual function as belonging to a same peripheral device.

13. A computing device, comprising:

a processor; and memory storing instructions which, when executed by the processor, enables the processor to perform method for processing a function command for a peripheral device, the method comprising:

obtaining, by a device controller intermediary, a function command from a virtual machine, wherein the function command is for function operations to be performed on a peripheral device and wherein the function command comprises function parameters that include properties of the function command, the function operations, and a location of unprocessed data;

making a first determination that a plurality of peripheral devices including at least one remote peripheral device have sufficient resources to perform the function operations of the function command, wherein the at least one remote peripheral device is in a different computing device from the virtual machine and the device controller intermediary;

generating a composite peripheral device using resources of the plurality of peripheral devices to perform the function operations of the function command;

generating, after generating the composite peripheral device, emulated functions for the virtual machine to communicate with the plurality of peripheral devices;

forwarding the function command to the plurality of peripheral devices that make up the composite peripheral device;

in response to forwarding the function command:

receiving processed data from the plurality of peripheral devices, wherein the unprocessed data is processed by the plurality of peripheral devices; and providing the processed data to the virtual machine using the emulated functions from the function command that presents the processed data as coming from a single peripheral device.

14. The computing device of claim 13, wherein the function command is received at an emulated remote function of the device controller intermediary.

15. The computing device of claim 14, wherein the function command is forwarded to a physical function of the remote peripheral device, wherein the physical function is associated with the emulated remote function.

16. The computing device of claim 14, wherein the composite peripheral device further comprises emulated virtual functions associated with the plurality of peripheral devices.

17. The computing device of claim 16, wherein the device controller intermediary presents, to the virtual machine, the emulated remote function and the emulated virtual functions as belonging to a same peripheral device.

* * * * *